US008432797B2

(12) United States Patent
Fonseca, Jr. et al.

(10) Patent No.: US 8,432,797 B2
(45) Date of Patent: Apr. 30, 2013

(54) METHOD AND SYSTEM FOR DISTRIBUTED ADMISSION CONTROL IN MOBILE AD HOC NETWORKS (MANETS)

(75) Inventors: Benedito J. Fonseca, Jr., Glen Ellyn, IL (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1071 days.

(21) Appl. No.: 11/877,778

(22) Filed: Oct. 24, 2007

(65) Prior Publication Data

US 2009/0109891 A1   Apr. 30, 2009

(51) Int. Cl.
*H04J 1/16*   (2006.01)
*H04J 3/14*   (2006.01)
*H04L 1/00*   (2006.01)
*H04L 12/26*   (2006.01)

(52) U.S. Cl.
USPC ............ 370/230; 370/231; 370/232; 370/235

(58) Field of Classification Search .................. 370/229, 370/230, 230.1, 231–240, 241–253; 709/238–244, 709/230–234
See application file for complete search history.

(56) References Cited

U.S. PATENT DOCUMENTS

| 2003/0202468 | A1 | 10/2003 | Cain et al. | |
|---|---|---|---|---|
| 2005/0052995 | A1* | 3/2005 | Gu et al. | 370/230 |
| 2005/0111462 | A1 | 5/2005 | Walton et al. | |
| 2006/0146704 | A1* | 7/2006 | Ozer et al. | 370/229 |

FOREIGN PATENT DOCUMENTS

| EP | 1610503 A1 | 6/2004 |
|---|---|---|
| GB | 2411549 A1 | 8/2005 |

OTHER PUBLICATIONS

PCT International Search Report Application No. PCT/US2008/079245—Dated Mar. 26, 2009—14 Pages.
Ferguson et al., "Quality of service; delivering QoS on the Internet and in corporate networks." Wiley, Chapter 1, 1998, pp. 1-8.
Stallings, W., "Data and Computer Communications," Prentice Hall, Section 11.6, 1996, pp. 347-360.
Guimaraes et al., "Quality of Service for Mobile Ad-hoc Networks: an Overview," Technical Univ. of Catalonia, Jul. 1, 2004, pp. 1-6.
Xiao et al., "A Flexible Quality of Service Model for Mobile Ad-Hoc Networks," IEEE; Vehicular Technology Conference Proceedings, vol. 1, 2000, pp. 445-449.

(Continued)

*Primary Examiner* — Kwang B Yao
*Assistant Examiner* — Adam Duda

(57) ABSTRACT

Techniques are provided for distributed admission control (AC) in a mobile ad hoc network (MANET). When the source node transmits a new communication stream (NCS) toward a destination node, other nodes allow transmission of the NCS during a temporary admission period even though the NCS has not yet been admitted. The nodes can determine whether the NCS causes degradation of any existing communication stream(s) (ECSs) supported by that node based on existing QoS requirements associated with the ECSs. In some implementations, nodes which determine that they are unable to support ECSs transmit an indicator which notifies other nodes that admission of the NCS is denied by that node. By contrast, if none of the nodes transmit an indicator during the temporary admission period, then the NCS is "admitted" to the MANET and the source node is permitted to keep transmitting the NCS, a variation thereof or another new communication stream.

22 Claims, 5 Drawing Sheets

OTHER PUBLICATIONS

Lee, S. et al., "INSIGNIA: In-band Signaling Support for QOS in Mobile Ad Hoc Networks," Proceedings of 5th Int'l Workshop on Mobile Comm., Oct. 1998, pp. 1-12.

Wu, K. et al., "QoS Support in Mobile Ad Hoc Networks," Crossing Boundaries—an Interdisciplinary Journal vol. 1, No. 1, 2001, pp. 1-16.

Ahn, G.-S., Campbell, A.T., Veres, A., Sun, L.-H.; "Supporting Service Differentiation for Real-Time and Best-Effort Traffic in Stateless Wireless Ad Hoc Networks (SWAN)"; IEEE Trans. on Mobile Computing, vol. 1, No. 3, Jul.-Sep. 2002.

Calafate, C.; Manzoni, P.; Malumbres, M.; "Supporting Soft Real-Time Services in MANETs Using Distributed Admission Control and IEEE 802.11e Technology"; Proc. IEEE Symp. Computers and Comm. (ISCC 2005); 2005.

Chakeres, I.D.; Belding-Royer, E.M.; "PAC: Perceptive Admission Control for Mobile Wireless Networks"; IEEE Proc. First Int. Conf. on QoS in Heterogeneous Wired/Wireless Networks (QSHINE'04), 2004.

Dong, Y.; Makrakis, D.; Sullivan, T.; "Effective Admission Control in Multihop Mobile Ad Hoc Networks"; IEEE Proc. ICCT 2003, pp. 1291-1294.

El-Gendy, M.; Bose, A.; Shin, K.; "Evolution of the Internet QoS and Support for Soft Real-Time Applications"; Proc. IEEE, vol. 91, No. 7, Jul. 2003.

Gozdecki, J.; Jajszczyk, A.; Stankiewicz, R.; "Quality of Service Terminology in IP Networks"; IEEE Comm. Mag.; Mar. 2003; pp. 153-159.

Kunniyur, S.; Srikant, R.; "End-to-End Congestion Control Schemes: Utility Functions, Random Losses and ECN Marks"; IEEE/ACM Trans. on Networking, vol. 11, No. 5, Oct. 2003.

Lin, C.R.; "Admission Control in Time-Slotted Multihop Mobile Networks"; IEEE Journal Selec. Areas in Comm.; vol. 19, No. 10, Oct. 2001.

Lindgren, A.; Beding-Royer, E.M.; "Multi-path Admission Control for Mobile Ad Hoc Networks"; ACM SIGMOBILE Mobile Computing and Communications Review, 2004, pp. 68-71.

Liaw, Y.S.; Dadej, A.; Jayasuriya, A.; "Estimating Throughput Available to a Node in Wireless Ad-hoc Networks"; IEEE 1st Int. Conf. on Mobile Ad-Hoc and Sensor Systems; pp. 555-557; Oct. 2004.

Lu, H.-L.; Faynberg, I.; "An Architectural Framework for Support of Quality of Service in Packet Networks"; IEEE Comm. Mag., Jun. 2003.

Shenker, S.; "Fundamental design issues for the future Internet"; IEEE Journal on Selected Areas in Communications; Sep. 1995; pp. 1176-1188.

Tobagi, F.; Kleinrock, L.; "Packet Switching in Radio Channels: Part II—The Hidden Terminal Problem in Carrier Sense Multiple-Access and the Busy-Tone Solution"; IEEE Trans. on Comm., vol. 23, No. 12, Dec. 1975.

Valaee, S.; Li, B.; "Distributed Call Admission Control for Ad Hoc Networks"; Proc. IEEE Veh. Tech. Conf. 2002, vol. 2, pp. 1244-1248.

Xu, K.; Tang, K; Bagrodia, R.; Gerla, M.; Bereschinsky, M.;"Adaptive Bandwidth Management and QoS Provisioning in Large Scale Ad Hoc Networks"; IEEE Conf. on Military Communications (MICOM 2003), Oct. 2003.

Yang, Y.; Kravets, R.; "Contention-Aware Admission Control for Ad Hoc Networks"; Technical Report 2003-2337, Computer Science Dept. UIUC, Apr. 2003.

Yang, Y.; Kravets, R.; "Distributed QoS Guarantees for Realtime Traffic in Ad Hoc Networks", IEEE International Conference on Sensor and Ad Hoc Communications and Networks (SECON-2004), pp. 118-127.

PCT/US2008/079245—PCT International Search Report Dated Mar. 26, 2009—14 Pages.

International Preliminary Report on Patentability and Written Opinion for International Patent Application No. PCT/US2008/079245 mailed on May 6, 2010.

English Language Translation of Office Action mailed on Dec. 12, 2011 in Counterpart Chinese Patent Application No. 200880113242.4.

* cited by examiner

METHOD AND SYSTEM FOR DISTRIBUTED ADMISSION CONTROL IN MOBILE AD HOC NETWORKS (MANETS)

FIELD OF THE INVENTION

The present invention relates generally to wireless communications and more particularly to admission control techniques in a mobile ad hoc network.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. A mobile ad hoc network (MANET) typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly, techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate relay nodes ("multi-hopping") along a route until the packets reach the destination node. In such situations, each intermediate relay node routes the packets (e.g., data and control information) to the next node along the route, until the packets reach their final destination. For relaying packets to the next node, each node maintains routing information collected through communications with its neighboring nodes. The routing information can also be periodically broadcast in the network to reflect the current network topology. Alternatively, to reduce the amount of information transmitted for maintaining accurate routing information, the network nodes may exchange routing information only when it is needed. In many multi-hop ad hoc networks, multiple routes can be present between a source node and a destination node for communication of a particular data stream or "flow."

Ad hoc networks can generally be categorized into two different system architectures which support different control and/or resource allocation protocols. In distributed ad hoc network architectures, each node shares the entire spectrum with other nodes, and each node acts independently in selection of resources (e.g., frequency, time or code allocations). By contrast, in cluster ad hoc network architectures, a clusterhead node acts as a centralized point of control and manages resource allocation, control, and management functions for a cluster of proximate nodes somewhat like a base station in conventional cellular networks. Among other functions, the clusterhead node can direct control information and data traffic to appropriate nodes in the network. Adjacent clusters share resources, such as, time, frequency, or code allocations. The clusterhead node allocates resources among proximate nodes (associated with the clusterhead node) in its cluster based on service requests from the proximate nodes.

Quality-Of-Service (QoS) is becoming an increasingly important issue in many types of MANETs. QoS generally refers to control mechanisms to ensure that connections are able to meet their minimum communication requirements, such as time to provide service, voice quality, minimum data throughput, maximum end-to-end delay, echo, packet loss, reliability and so on. QoS can provide different priority to different users or data flows, or guarantee a certain level of performance to a data flow in accordance with requests from an application program or the internet service provider policy. QoS guarantees are important especially for real-time streaming multimedia applications, for example voice-over-IP (VoIP) and IP-TV, since these types of applications often require fixed bit rates and are delay sensitive, and QoS guarantees must be provided even as the MANET becomes congested.

One "building block" required to implement QoS is commonly referred to as "admission control." Admission control techniques control admission or entrance of new, inelastic communication streams or "traffic" into a MANET. Admission control can be employed whenever a system has finite capacity. The basic principle of admission control is that a new communication stream should only be "admitted" in the system if it does not cause the system to operate above its maximum capacity level; otherwise, the new communication stream should be denied access to the system. If admission control techniques are not implemented and a new communication stream is admitted causing the system to operate above its capacity level, one or more of the existing connections may no longer be able to support Quality-of-Service (QoS) requirements of the particular data stream.

It is desirable to apply admission control procedures in MANETs such that a new communication stream be permitted to enter the MANET (or be "admitted" to the MANET) only if the existing communication streams are able to maintain their QoS requirements. However, in a MANET, it is difficult to accurately determine the capacity of a particular communication scenario or topology due to the lack of central controller and due to the lack of knowledge of interference conditions in the MANET. Therefore, it is difficult for nodes to individually determine whether a new communication stream will cause one or more existing communication streams to no longer support its QoS requirements. It is desirable that nodes cooperate to perform admission control functions in a distributed manner.

Given that the capacity of a MANET depends on its topology, if a communication stream is denied access to the system, it may retry access through a different route, which may not cause degradation in the QoS of existing communication streams. In other words, upper layers interpret a denial decision as a signal to try alternative routes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments

Figure 1:
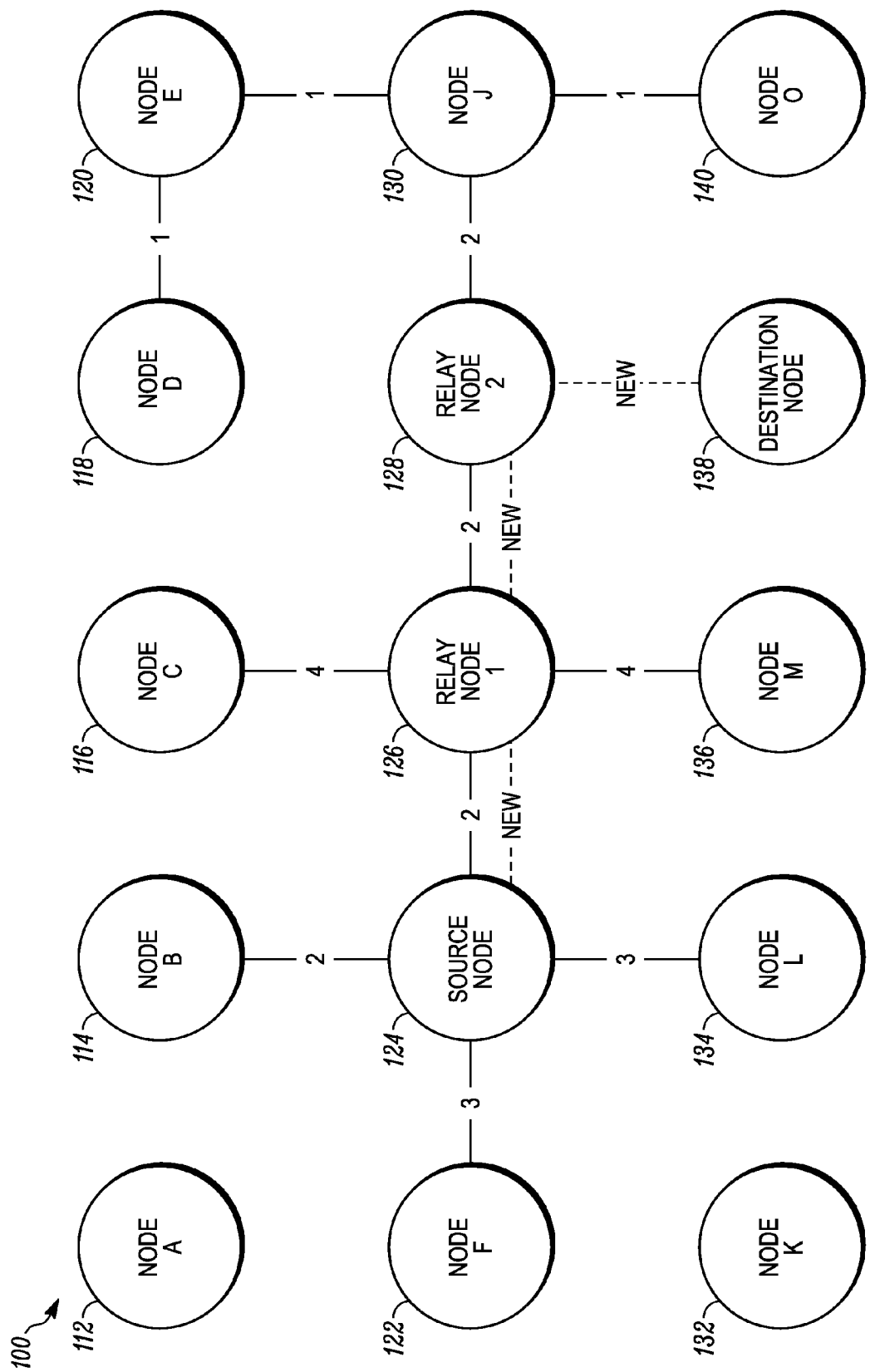
FIG. 1 is a block diagram of a mobile ad hoc network (MANET)

Skilled artisans will appreciate that elements in the figures are illustrated for simplicity and clarity and are not drawn to scale.

DETAILED DESCRIPTION

Before describing in detail embodiments that are in accordance with the present invention, it should be observed that the embodiments reside primarily in combinations of method steps and apparatus components related to distributed admission control techniques in a mobile ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for distributed admission control techniques in a mobile ad hoc network. The non-processor circuits may include, but are not limited to, a radio receiver, a radio transmitter, signal drivers, clock circuits, power source circuits, and user input devices. As such, these functions may be interpreted as steps of a method for distributed admission control in a mobile ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

Any embodiment described herein is not necessarily to be construed as preferred or advantageous over other embodiments. All of the embodiments described in this Detailed Description are illustrative and are described to enable persons skilled in the art to make or use the invention and not to limit the scope of the invention which is defined by the claims.

Terminology

In this document, the terms "communication stream," "communication session," and "communication flow" can be used interchangeably. As used herein, the term "communication stream" refers to a communication session or data stream which flows between a source node and a destination node. The communication stream often requires a particular, guaranteed Quality of Service (QoS). In some cases, the communication stream passes "through" one or more intermediate relay nodes located between the source node and the destination node.

As used herein, the term "Quality of Service (QoS)" refers to one or more requirements of a particular communication stream or "flow" that is transmitted between a source node and a destination node. These requirements can include, for example, data rate requirements, bandwidth requirements, delay requirements, jitter requirements, maximum packet loss requirements, etc. The QoS requirements may be specified, for example, using at least one of a plurality of fields for the communication stream including, but not limited to, a bandwidth request field, a maximum or minimum data rate field, a maximum or minimum delay field, a jitter field, a maximum packet loss field and a total delay incurred field. For example, the minimum data rate is the data rate which needs to be maintained at all the intermediate nodes to satisfy the QoS requirement of this particular data stream. The maximum delay is the maximum delay which packets of a data stream can sustain while traversing along the route while still maintaining the QoS requirement.

As used herein, the term "support," as used in the phrases "node which supports," "node supports . . . communication stream," "support communication stream," "node supports a communication stream" "node supporting a communication stream" and other variations thereof, mean that a node is participating in communication of a communication stream, and this can mean that a node is generating a communication stream (e.g., source node), transmitting a communication stream, receiving a communication stream, relaying or retransmitting a communication stream (e.g., relay nodes), and/or processing a communication stream.

Overview of Admission Control

Admission control procedures are used to control the entrance of new communication sessions or streams into a network such that existing communication sessions or streams are not compromised. In other words, given a set of existing communication sessions or streams, admission control procedures avoid the entrance of a new communication session that can cause QoS degradation to any of the existing communication sessions. Admission control procedures are usually applied to sessions or streams that are forecasted to last for a relatively long time and that have clear traffic characteristics. Two-way voice communication sessions and other 'inelastic' traffic flows are example of sessions to which admission control procedures apply. Such sessions have the characteristic that they either exist with a certain fixed and pre-determined level of data throughput (and other QoS metrics) or they can not exist. To implement admission control procedures in a MANET, a variety of issues can arise which are not a concern in other types of networks.

In MANETs the communication channel is shared among nodes, whereas in the Internet, for example, routers have dedicated physical links between each other; i.e., when one router decides to transmit to another router, it simply accesses the physical cable that is dedicated for its communication, without any contention. In Ethernet networks a physical channel is shared among nodes of the network. However, in MANETs radio channels are used by nodes. As such, the carrier-sense multiple access (CSMA) procedures used in Ethernet can operate much more efficiently than in CSMA-based MANETs since an Ethernet transmission can be sensed by all nodes of the Ethernet network. In MANETs, the characteristics of radio transmission and the need for channel reuse causes the hidden and exposed node problems. For these reasons, it is important to consider specific Admission Control procedures for MANETs.

Another issue is the lack of central control. The lack of central coordination or control forces the admission control procedures to be "distributed" among nodes in the MANET. This is true in both autonomous MANETs and locally-centralized "cluster-based" MANETs. The distributed entities (nodes or cluster-head nodes) that make admission decisions have limited information about the resource utilization of neighboring nodes. Erroneous admission decisions can result, for example, because no single entity has all the information regarding other ongoing communication streams, and further because multiple entities are involved in making admission decisions based on limited information. Exchanging information among decision making nodes can help alleviate this problem; however, this undesirably increases control overhead in the network.

Another such issue relates to the difficulty in determining the current state of existing communication streams being communicated in the MANET, and whether the existing communication streams of the MANET are able to sustain the QoS requirements of those streams. For example, even if information needed to make an admission decision is concentrated at a single node, making the admission decision (i.e., whether a given communication stream can be successfully admitted given QoS requirements of existing communication streams) is a computationally intense process, requiring, for example, use of constrained optimization processing.

Overview of Distributed Admission Control (AC) Techniques

In accordance with some embodiments of the present invention, techniques are provided for distributed admission control (AC) in a mobile ad hoc network (MANET) which includes a plurality of nodes including, for example, a source node, a destination node, and a plurality of first nodes each supporting at least one existing communication stream which has one or more existing QoS requirements associated therewith. When the source node transmits a new communication stream toward the destination node along a first route, other nodes which receive the new communication stream allow transmission of the new communication stream during a temporary admission period even though the new communication stream has not yet been admitted. Each of the nodes which receive the new communication stream during the temporary admission period can determine whether the new communication stream causes degradation of any existing communication stream(s) supported by that node based on existing QoS requirements associated with the existing communication stream(s). If any nodes determine that they are unable to support existing QoS requirements of existing communication stream(s), then those nodes can then transmit an indicator which indicates that the new communication stream causes degradation of one or more existing QoS requirements associated with the existing communication stream(s) supported by that node. This indicator serves to notify other nodes that admission of the new communication stream is denied by that node. By contrast, if none of the nodes determine that the new communication stream causes degradation of existing communication streams supported by those nodes, then after the temporary admission period, the new communication stream is "admitted" and the source node is permitted to keep transmitting the new communication stream or a variation thereof.

Example embodiments will now be described below with reference to FIGS. 2 through 4 after a brief description of an example mobile ad hoc network (MANET). FIG. 1 is a block diagram of a mobile ad hoc network (MANET) including a plurality of nodes 112, 114, 116, 118, 120, 122, 124, 126, 128, 130, 132, 134, 136, 138, 140 and the topological communication spacings between those nodes 112-140. As illustrated in FIG. 1, at least some of the nodes 114, 116, 118, 120, 124, 126, 128, 130, 134, 136, 138, 140 are actively communicating with other nodes as represented by lines or communication links which connect particular ones of the nodes, and other nodes 112, 132 are not actively communicating with other nodes and therefore have no lines or communication links connecting those nodes 112, 132 to other nodes. In FIG. 1, any node 112-140 is presumed to be one hop away (e.g., within direct communication range of) from another horizontally adjacent node or another vertically adjacent node, and more than one hop away (e.g., outside direct communication range of) any diagonally located nodes. For instance, node A 112 is one hop away from node B 114 and node F 122, but is more than one hop away from source node 124. Moreover, although the example topology in FIG. 1 illustrates that all nodes are spaced apart from one another in a "grid," this topology is for illustrative purposes only and is not intended to imply that the nodes are physically spaced from each other in this manner, but instead merely implies that any node 112-140 is presumed to be within direct communication range of or "one hop away from" any other horizontally adjacent node or any another vertically adjacent node. In many real scenarios, the nodes are arbitrarily spaced apart with respect to one another by different physical distances, and the relative physical spacing between nodes changes arbitrarily as nodes 112-140 move about. For example, although FIG. 1 illustrates node A 112 and node K 132 as being equidistantly spaced apart with respect to node F 122, however, the illustrated topology merely implies that node A 112 and node K 132 are one communication hop away from node F 122 at this particular instant.

In general, the nodes can be classified as either a source node of a particular communication stream, a destination node of the particular communication stream, an intermediate relay node which relays the particular communication stream towards the destination node, or a peripheral node not actively involved in communicating the particular communication stream. In addition, any node can simultaneously function as a source node, a destination node, a relay node and/or a peripheral node with respect to different communication streams. For example, source node 124 serves as a source node with respect to new communication stream (NEW), serves as a relay node which supports two existing communication streams 2, 3 which flow through it, and is a peripheral node with respect to communication streams 1, 4. With respect to the existing communication streams 1-4, node D 118 sources communication stream 1 to node O 140 (destination) through node E 120 and node J 130. Node B 114 sources communication stream 2 to node J 130 (destination) through source node 124, relay node 1 126 and relay node 2 128. Node F 122 sources communication stream 3 to node L 134 (destination) through source node 124. Node C 116 sources communication stream 4 to node M 136 (destination) through relay node 1 126. As such, nodes 120, 124, 126, 128, 130 serve as relay nodes, where node E 120 and node J 130 each support existing communication stream 1 which flows through it; source node 124 supports two existing communication streams 2, 3 which flow through it; relay node 1 126 supports two existing communication streams 2, 4 which flow through it; and relay node 2 128 supports one existing communication stream 2 which flows through it.

The nodes illustrated in FIG. 1 perform different functions depending on their relative roles with respect to a given communication. For example, a node can be an end node (i.e., source node or destination node) of a new communication stream (NEW) seeking admission, an intermediate relay node of the new communication stream (NEW), an end node of existing communication stream 1-4, a relay node of an existing communication stream 1-4 or a peripheral node. In the scenario illustrated in FIG. 1, there is one new communication stream (NEW) which seeks admission for communication through the MANET 100, and there are four existing communication streams 1-4. The new communication stream (NEW) is illustrated in FIG. 1 with a dashed-line labeled since it is not yet admitted and seeks "permission" or "authorization" from other nodes to flow from source node 124 to the destination node 138 via a communication path or "route" which includes communication links with relay node 1 126 and relay node 2 128.

Depending on the particular radio and interference conditions of other nodes in the network, the new communication flow between nodes 124, 138, if admitted, may cause degradation of one or more of the existing communication streams 1-4 such that quality of service (QoS) requirements of one or more of the existing communication streams are violated. To address such issues, distributed admission control techniques for MANETs will now be described below with reference to FIG. 2 and FIGS. 3 and 4.

Figure 2:
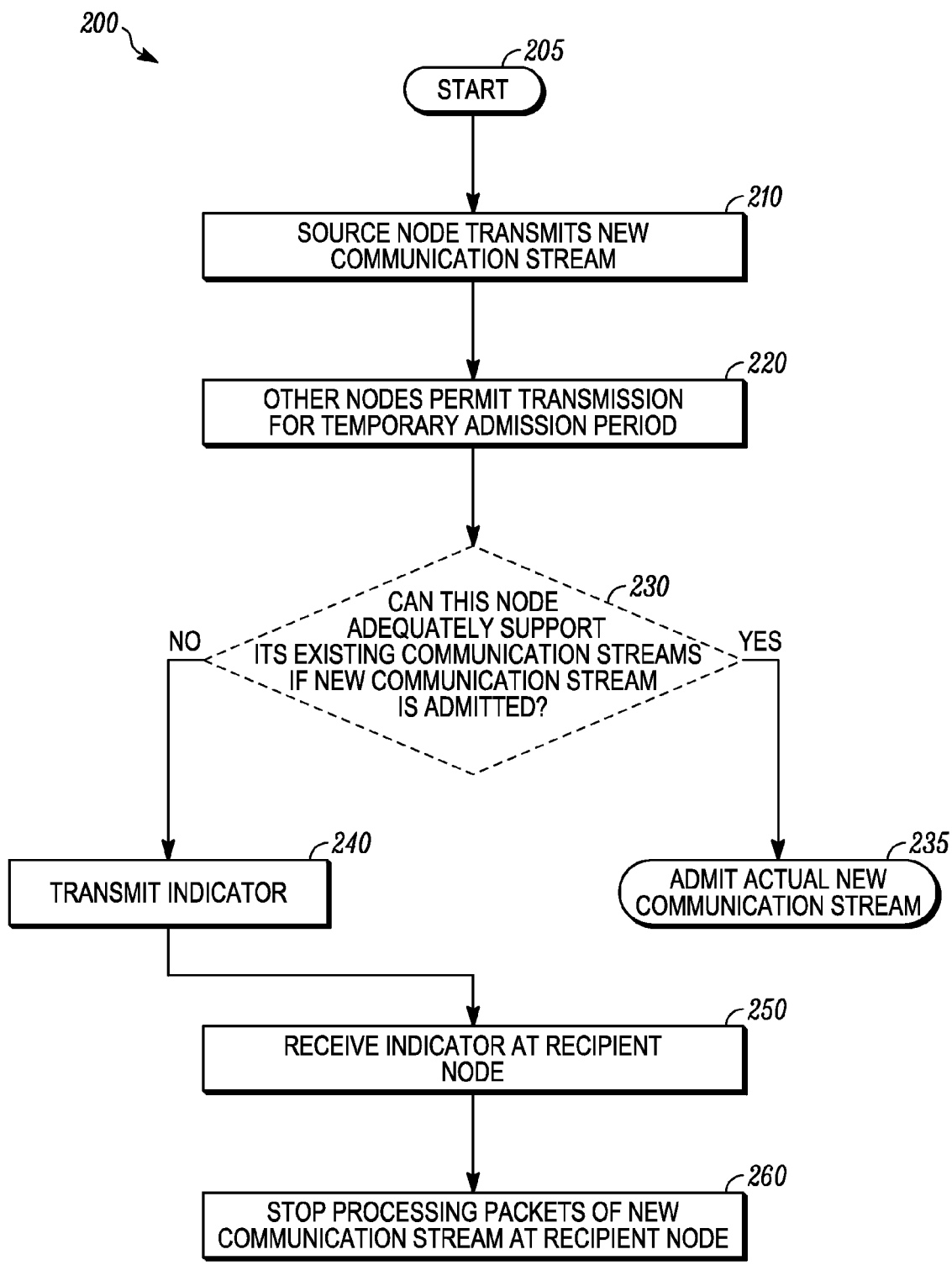
FIG. 2 is a flowchart showing a method for distributed admission control (AC) in the MANET in accordance with some embodiments of the invention.

FIG. 2 is a flowchart showing a method for distributed admission control (AC) 200 in the MANET in accordance with some embodiments of the invention.

The method 200 for distributed admission control (AC) begins at step 205, and at step 210, the source node 124 transmits a new communication stream (NEW) toward the destination node 138 along a first route which includes relay nodes 126, 128. Upon receiving (or detecting the presence of) the new communication stream during a temporary admission period, other nodes which receive (or detect the presence of) the new communication stream (NEW) will "allow" or "permit" transmission of the new communication stream (NEW) at step 220 even though the new communication stream has not yet been admitted. For example, node J 130 does not "receive" the new communication stream (NEW), but it may still be able to detect the presence of the new communication stream (NEW), and therefore node J 130 will allow or permit continued transmission of the new communication stream (NEW) during the temporary admission period.

At step 230, each node which receives the new communication stream during the temporary admission period can determine whether its existing communication stream(s) would still be supported (per QoS requirements of those existing communication stream(s)) if the new communication stream (NEW) is admitted. In one implementation, if the new communication stream causes degradation of any existing communication stream(s) supported by that node as determined based on existing QoS requirements associated with the existing communication stream(s), then the decision at block 230 would be "NO."

If none of the nodes determine that the existing communication stream(s) it supports would be degraded (per QoS requirements of those existing communication stream(s)) if the new communication stream (NEW) is admitted, then after the temporary admission period, the new communication stream is "admitted" at step 235 and the source node is permitted to keep transmitting the new communication stream or a variation thereof. In other words, when a node determines that the node can adequately support QoS requirements of its existing communication streams, a new or continued transmission of the new communication stream (NEW) by the source node will be permitted. Here, a "new or continued transmission" of the new communication stream (NEW) can refer to: a continuation of the current, new communication stream; a new version of the current, new communication stream (i.e., starting at the beginning); or another communication stream different than the current, new communication stream.

By contrast, if any nodes determine that they are unable to support existing QoS requirements of their existing communication stream(s), then those nodes can then transmit an infringement indicator at step 240. The infringement indicator indicates that the new communication stream causes degradation of one or more existing QoS requirements associated with the existing communication stream(s) supported by that node, and serves to notify other nodes that admission of the new communication stream is denied. At step 250, at least some of the nodes receive the infringement indicator, and at step 260, those nodes stop processing packets of the new communication stream so that the new communication stream is "denied" admission.

Figure 3A:
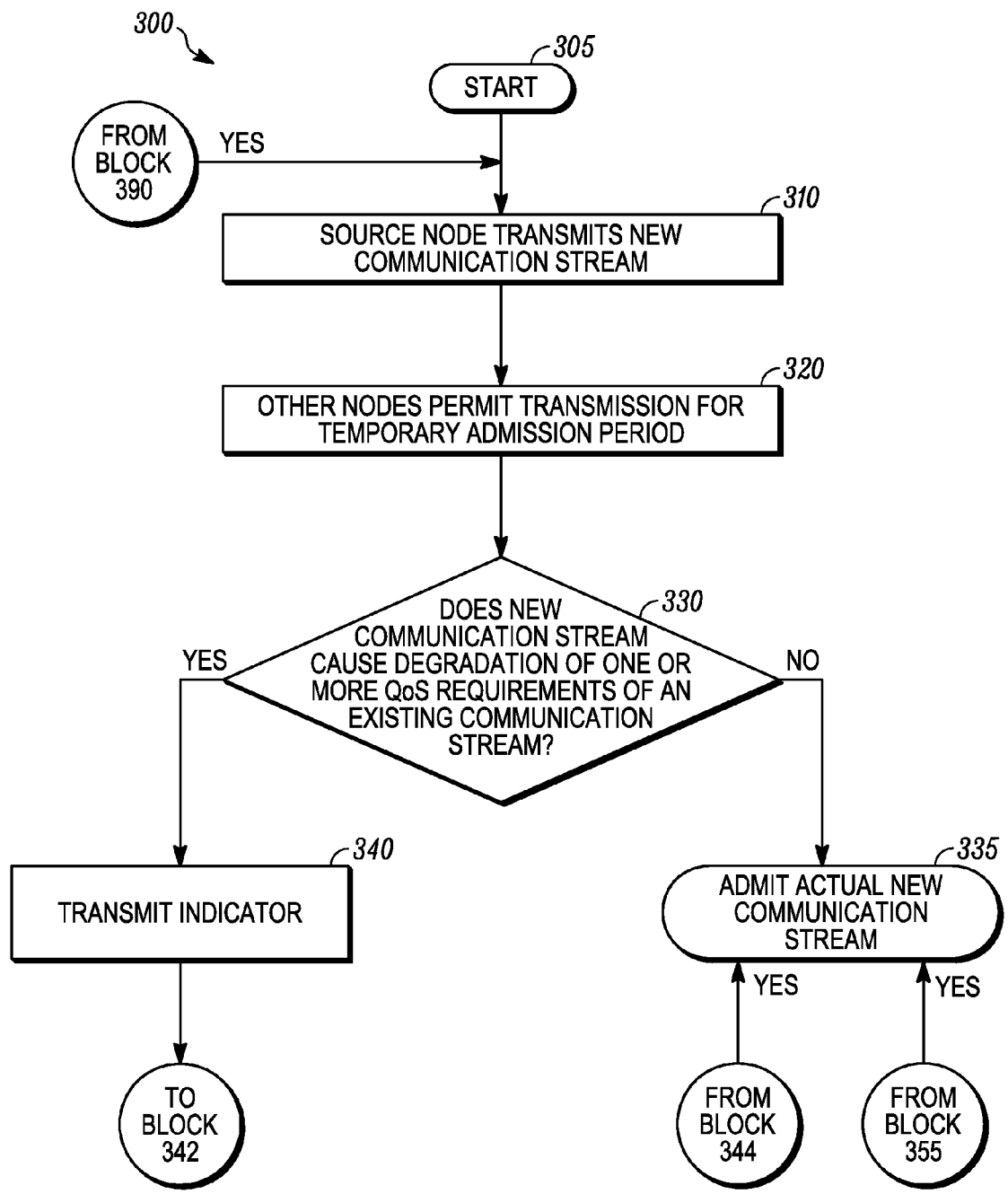
FIG. 3 is a flowchart showing a method for distributed admission control (AC) in the MANET in accordance with some implementations of the invention.

FIG. 3 is a flowchart showing a method 300 for distributed admission control (AC) in the MANET in accordance with some implementations of the invention. To illustrate how the method 300 for distributed admission control (AC) can be applied to one example network configuration where a new communication stream (NEW) seeks to be admitted, method 300 will be described below with reference to the mobile ad hoc network (MANET) 100 illustrated in FIG. 1; however, it will be appreciated that method 300 could be applied in the context of any MANET configuration. As described above, the MANET 100 of FIG. 1 comprising a plurality of nodes including inactive nodes 112, 132 (i.e., nodes not supporting or participating in communication of any communication stream), a source node 124, a destination node 138, relay nodes 126, 128 along the route between the source node 124 and the destination node 138, and a plurality of peripheral nodes 114, 116, 118, 120, 122, 130, 134, 136, 140. Each of peripheral nodes 114, 116, 118, 120, 122, 130, 134, 136, 140 "support" (or are participating in communication of) at least one existing communication stream 1-4 which has one or more existing QoS requirements associated therewith, but do not support communication of a new communication stream (NEW) which seeks to be communicated between the source node 124 and the destination node 138. In the description below, the peripheral nodes 114, 116, 118, 120, 122, 130, 134, 136, 140 are also referred to as "first" nodes 114, 116, 118, 120, 122, 130, 134, 136, 140 for simplicity.

The method 300 for distributed admission control (AC) starts at step 305, and at step 310 the source node 124 begins to transmit a new communication stream (NEW) having particular QoS requirements associated therewith (e.g., VoIP flow that requires guaranteed service) toward the destination node 138 along a route between the source node 124 and the destination node 138. As will be appreciated by those skilled in the art, one or more intermediate relay nodes 126, 128 can be present along the route between the source node 124 and the destination node 138. In such scenarios, the new communication stream is communicated to the destination node "via at least one relay node." For instance, in the example illustrated in FIG. 1, the new communication stream (NEW) is communicated from the source node 124 towards the destination node 138 by any intermediate relay nodes 126, 128. In other scenarios (not illustrated in FIG. 1), in which no intermediate nodes are present between the source node 124 and the destination node 138, method 300 still works even when the route does not include any intermediate relay nodes (i.e., when the source node is a one-hop neighbor of the destination node 138).

Depending on the implementation, the new communication stream (NEW) can be either an actual communication stream transmitted from the source node 124 (and destined for destination node 138) or can be a new "test" or "dummy" communication stream. In one exemplary implementation, the source node 124 can transmit dummy packets at the same rate at which it would transmit actual packets of the new communication stream (NEW) (e.g., dummy packets are transmitted at the same rate as the actual new communication stream (NEW) would consume). In some implementations, the dummy packets are of a same packet size and a same packet interarrival time of regular packets which are transmitted as part of the new communication stream (NEW). The transmission of dummy packets may be preferred in implementations in which the communication between the source and destination nodes should only be allowed to begin after it has been confirmed that the new communication stream can be admitted. For example, in VoIP applications, it may be undesirable to allow the voice communication to start and interrupt it moments later if the communication stream is denied.

During initial transmission of the new communication stream (NEW), it has not yet been "admitted," however, at step 320, each of the nodes 112-140 (including source, destination, relay nodes (if any), and peripheral nodes (if any)) allow transmission of the new communication stream (NEW) to temporarily flow for a temporary admission period. When processing packets of the new communication stream (NEW), the recipient node can determine whether the temporary admission period has expired. The temporary admission period can be a pre-determined period or variable depending on network conditions, and represents the amount time during which the new communication stream (NEW) is temporarily admitted or permitted to flow without being actually admitted. After the temporary admission period, assuming no nodes object to admission of the new communication stream by transmitting an indicator, the new communication stream is "admitted" and the source node 124 can start transmitting actual traffic packets of the new communication stream (NEW). There are numerous ways by which a node can determine whether or not a particular communication stream is still within its temporary admission period, as will be described below at step 344.

At step 330, each of the nodes 112-140 which receive the new communication stream (NEW) determine, during the temporary admission period, whether the new communication stream (NEW) causes degradation of any existing communication streams 1-4 supported by and/or flowing through that node based on existing QoS requirements associated with the existing communication streams 1-4. In this regard, the "existing" communication streams can be any communication streams the node is involved in communicating, including for example, communication streams flowing through the particular node, generated by the particular node, destined to the particular node, processed by the particular node, or relayed by the particular node. In the implementation illustrated in FIG. 3, if the node determines that the new communication stream (NEW) does not cause degradation of any existing communication streams 1-4 supported by and/or flowing through that node based on existing QoS requirements associated with the existing communication streams 1-4, then method 300 proceeds to step 335 where the new communication stream (NEW) is admitted. There are multiple techniques for making the determination at step 330 and one embodiment will be described below with reference to FIG. 4.

At step 340, any node or node(s), that determine that the new communication stream (NEW) is to be denied admission (e.g., because the new communication stream (NEW) causes degradation of any existing communication streams supported by that node), transmit an indicator which indicates that the new communication stream (NEW) is to be denied admission. The indicator transmitted from a node at step 340 indicates to other nodes that the network topology is currently unable to support the new communication stream (NEW) without disrupting existing QoS requirements associated with one or more of the existing communication streams 1-4. This way any nodes "participating in communication of" the new communication stream (NEW) (source node, destination node and any intermediate relay nodes along the route between the source node and the destination node) are likely to receive notice that the new communication stream (NEW) might disrupt one or more existing communication streams.

It should be appreciated that the term "indicator" is not to be interpreted in a restrictive sense. Throughout the description the term "indicator" is used to describe a communication which includes information which indicates that the network topology is currently unable to support the new communication stream without disrupting existing QoS requirements associated with any existing communication streams. The indicator comprises a reference to the new communication stream (NEW) that is being denied admission, a transmitting node identifier (ID), one or more metrics and, optionally, the IDs of other nodes that may have also transmitted the indicator in the recent past. In one implementation, each node which transmits an indicator can include a node ID of the node which initially generated the indicator and a metric (C) whose value is a function of the ratio of time that the node senses the channel as being busy and a number of indicators received from external communication streams. Nodes of the communication stream being denied which relay the indicator towards the source node 124 can also attach their values of the metric (C) to the indicator as the indicator is being returned to the source node 124. In some implementations, nodes of a temporarily admitted new communication stream (NEW) can attach their current metrics (C) into fields of the "dummy" packets being transmitted during the temporary admission period. This provides information regarding the metrics (C) of all the nodes in the route. In another implementation, the node transmitting an indicator includes a metric that indicates a lower QoS level in which the new communication stream being denied would have a higher chance of being accepted, allowing the source node the possibility of changing or retrying the new communication stream with a lower QoS level. For example, the indicator can include information which indicates whether the new communication stream (NEW) would have a better chance of admission if the overall QoS requirements of the new communication stream (NEW) are changed or reduced to a lower QoS level (i.e., the lower QoS level would contain a lower effective data throughput or higher end-to-end delay).

Depending on the implementation, the indicator can be transmitted in a unicast transmission, a multicast transmission, or a broadcast transmission.

In some implementations, the indicator can be implemented as an independent or "stand-alone" message called a QoS Infringement Alert (QIA) message. In other implementations, the indicator can implemented as part of a message such as a standard HELLO message, a beacon message, neighbor advertising message, routing advertising message, or link state advertising message, for example, as an information element or field that can be included as part of another message. In still other implementations, the indicator can implemented as part of a data packet by using specific bits in a packet (e.g., in a header of a data packet, for example, by setting specific bits in a MAC header to indicate the QoS infringement condition).

In one implementation of step 340, when the node is not a relay node for any communication stream that is still in its temporary admission period (e.g., an end node of the new communication stream), then the node can broadcast the indicator. Although not illustrated in FIG. 3, if QoS infringement continues, this implementation of step 340 can be repeated regularly or periodically with a period set high enough so that the number of indicators which are broadcast is not too large.

In one implementation of step 340, when a particular peripheral node 114, 116, 118, 120, 122, 130, 134, 136, 140 which is not located along the route determines that the particular peripheral node is unable to support existing QoS requirements of one or more existing communication streams 1-4 and that the QoS of an existing communication stream 1-4 which it supports is degraded by or as a result of the new communication stream (NEW), the particular peripheral node broadcasts an indicator to nodes involved in communicating the new communication stream (NEW). For example, the existing communication stream 4 of FIG. 1 could suffer QoS degradation and peripheral node 136 could generate and broadcast an indicator. In some implementations, in order to reduce the number of indicators and reduce the control overhead caused by such indications, the node performs additional checks before deciding to broadcast (as opposed to unicast or multicast) the indicator. For example, in one implementation, the decision of whether to broadcast an indicator can be based on the fraction of time that the channel is busy. In another implementation, the node monitors transmissions of neighbor nodes, determines whether a packet transmission rate has increased by more than a particular percentage in at least one of its neighbor nodes, and broadcasts the indicator only if packet transmission rate has increased by more than a particular percentage in at least one of its neighbor nodes. By monitoring the packet transmission rate of neighbor nodes, a node can determine whether (or not) to suppress the transmission of the indicator. When a node suppresses transmission of the indicator to the nodes which are proximate the source node, when an existing stream is disrupted by another new communication stream that is near the node, the overall control overhead associated with transmission, reception and processing of the indicator messages can be reduced.

In another implementation of step 340, when a particular node 112-140 determines that the particular node is unable to support existing QoS requirements of one or more existing communication streams 1-4 and that the QoS of an existing communication stream 1-4 which it supports is degraded by or as a result of one or more new communication streams (NEW), the particular node transmits a unicast indicator to a neighbor node which has a highest increase of packet transmission rate during a last measurement period. By unicasting the transmission of the indication to a particular neighbor node, the transmitting node is able to deny just a subset of the new communication streams.

In another implementation of step 340, a relay node which is located along the route of the new communication stream (NEW) can transmit a unicast indicator towards the source node 124 when the particular relay node determines that it is unable to support existing QoS requirements of one or more existing communication streams 1-4 because of the new communication stream (NEW).

In another implementation of step 340, if an end node (source node 124 or destination node 138) of a new communication stream (NEW) determines that the new communication stream (NEW) is causing QoS infringement of an existing communication stream 1-4, the end node 124, 138 transmits an indicator which indicates the QoS infringement to all relay nodes 126, 128 involved in communicating the new communication stream (NEW). In one implementation, the end node 124, 138 can do this by communicating a unicast indicator (e.g., a QoS Infringement Alert (QIA) message) which references the new communication stream (NEW), and may also optionally include a timer to avoid generating too many indicators. In another implementation, the source node 124 can communicate the indicator using specific bit(s) in one or more packets of the new communication stream (NEW) (e.g., communicate specific bits in the MAC header of packets of the new communication stream (NEW)). In an implementation where specific bit(s) in the MAC header are used, such bits can be set in all packets of the new communication stream (NEW) generated by the source node 124.

At step 342, one or more nodes receive the indicator, and at step 344 determine whether the temporary admission period has expired. There are numerous ways by which a node can determine whether or not a particular communication stream is still within its temporary admission period. In general, the nodes 112-140 can detect whether the new communication stream (NEW) is in its temporary admission period by inspecting information in packets of the communication stream.

For example, in one implementation, each node tracks the time that each communication stream has existed and compares it against a time threshold to determine whether the communication stream is within the temporary admission period.

In still another implementation, each node can determine a category of the last received packet for a particular communication stream, and then, based on the category of the last received packet, determine whether the communication stream is within the temporary admission period. This approach beneficially reduces the amount of processing by nodes in determining whether a particular communication stream is still within its temporary admission period. For instance, in one implementation, where the new communication stream is initially sent using "dummy" or "test" packets, each node can determine if the last packet of the communication stream that the node received is a dummy packet, and, if so, determines that the communication stream is within the temporary admission period.

In yet another implementation, each node can determine if the last packet of the communication stream that the node received has a mark on its header (or even a mark on an IP header, like the TOS field) indicating that the flow is still temporary, and, if so, determines that the communication stream is within the temporary admission period.

In still another implementation, the source node 124 adds a value to packets of new communication stream (NEW) indicating the remaining duration of the temporary admission period. Recipient nodes can then check this value to determine whether the new communication stream (NEW) is still within the temporary admission period. For example, the source node 124 adds a value to each packet (in a control field, for example) which indicates a duration until a temporary admission period for the new communication stream (NEW) expires (i.e., time until time remaining until the new communication stream (NEW) becomes admitted), and then, based on the value, each node can determine whether the new communication stream (NEW) is still within the temporary admission period. This implementation is particularly useful, for example, in a scenario where a node is processing or communicating multiple temporarily admitted communication streams, and decides to block just some of them, since the node can use the remaining time information to decide which temporarily admitted communication streams to deny or block (e.g., the node could deny or block the most recent temporarily admitted communication stream).

If it is determined at step 344 that the temporary admission period has expired, then the method 300 proceeds to step 335 where the new communication stream (NEW) is admitted. If the temporary admission period has not expired at step 344, then the method 300 proceeds to step 350, where the method 300 proceeds based on the status (i.e., source node or other node) of the receiving node with respect to the new communication stream (NEW) referenced by the indicator.

For example, when the node is any node other than the source node 124 (e.g., any node which is not the source node such as relay nodes 126, 128 or destination node 138), the method 300 proceeds to step 355 or 360 depending on the implementation since step 355 is optional and is not practiced in all implementations.

In implementations where step 355 takes place, the node determines whether the new communication stream (NEW) has at least one metric which is greater than a corresponding metric of an existing communication supported by the node. The metric is to be computed based on any of the following parameters or combination of them: type of new communication stream; organizational rank of user of source node; and organizational rank of user of destination node. In essence, higher metric implies that the new communication stream is "better" or has a higher priority than at least one of the existing communication streams.

If the new communication stream (NEW) has at least one metric which is greater than a corresponding metric of an existing communication supported by the node, then the method 300 proceeds to step 335 where the new communication stream (NEW) is admitted. However, if the new communication stream (NEW) does not have at least one metric which is greater than a corresponding metric of an existing communication supported by the node, then the method 300 proceeds to step 360, where the node stops processing and/or relaying packets of the new communication stream (NEW). In implementations where step 355 is omitted, the method 300 proceeds directly from step 350 to step 360, where admission of the new communication stream (NEW) is denied.

In one implementation of step 360, any of the nodes (destination node, or relay nodes of the new communication stream) which receive an indicator stop processing and/or relaying packets of the new communication stream (NEW), and drops all of outstanding packets of the new communication stream (NEW). In one implementation, the destination node 138 monitors the channel for an indicator to detect QoS infringement by the new communication stream (NEW), and if the destination node 138 receives an indicator (during the temporary admission period) and notices QoS infringement, the destination node 138 stops processing received data packets of the new communication stream (NEW). Similarly, the relay node 126 monitors the channel for an indicator to detect QoS infringement by the new communication stream (NEW), and if the relay node 126 receives an indicator (during the temporary admission period) and notices QoS infringement, the relay node 126 stops relaying received data packets of the new communication stream (NEW). In one implementation, the relay node stops relaying packets for all temporarily admitted new communication stream (NEW) and drops all of their outstanding packets.

In some scenarios, it is possible that a node is participating in the communication of two or more new communication streams (NEW) seeking admission (e.g., is a relay node of 2 or more temporarily admitted communication streams), and the node can receive multiple different indicators which reference to different new communication streams. As noted above, one approach is for the node to deny all new communication streams referenced by the indicator. However, in other implementations, instead of denying all temporarily admitted new communication streams, the node can deny one or more of the temporarily admitted new communication streams. The number of new communication streams which are denied or "blocked" can be determined by the node based on a number of metrics. Thus, in some implementations, where a node is participating in communication of two or more new communication streams (NEW) seeking admission, the node can prioritize the new communication streams (NEW) based on one or more metrics. In other words, the node can assign a priority or order to each of the new communication streams based on their respective metrics. The metrics may comprise, for example, the type of new communication stream; organization rank of a user of the source node; organization rank of a user of the destination node; duration during which each new communication stream has been in a temporary admission period; QoS requirements of the new communication stream, fraction of time that the channel is busy, number of packets in the node's queue, age of the new communication stream, etc. In one implementation, the node can then determine a subset of the new communication streams (NEW) comprising: one or more lower priority, new communication streams (NEW) having the lowest metrics. When the node receives multiple indicator(s), the node can then stop processing, relaying or receiving packets associated with the one or more of the lower priority new communication streams (NEW).

At step 370, the node(s) forward the indicator(s) towards the source node 124 which is generating the new communication stream (NEW). In one implementation of step 370, the node sends a unicast indicator (e.g., unicast QIA message) towards the source node 124. Although not illustrated in FIG. 3, any node which receives the unicast indicator, stops processing or relaying packets of the new communication stream (NEW), drops all of its buffered packets and forwards the unicast towards the source node 124 of the new communication stream (NEW), and when the source node 124 receives the indicator, the source node 124 stops generating packets of the new communication stream (NEW).

In some implementations, any node that receives the indicator from an external route can forward the indicator to both the source node 124 and destination node 138 and all nodes that receive this forwarded indicator can send their metrics (C) towards the source node 124.

Figure 3B:
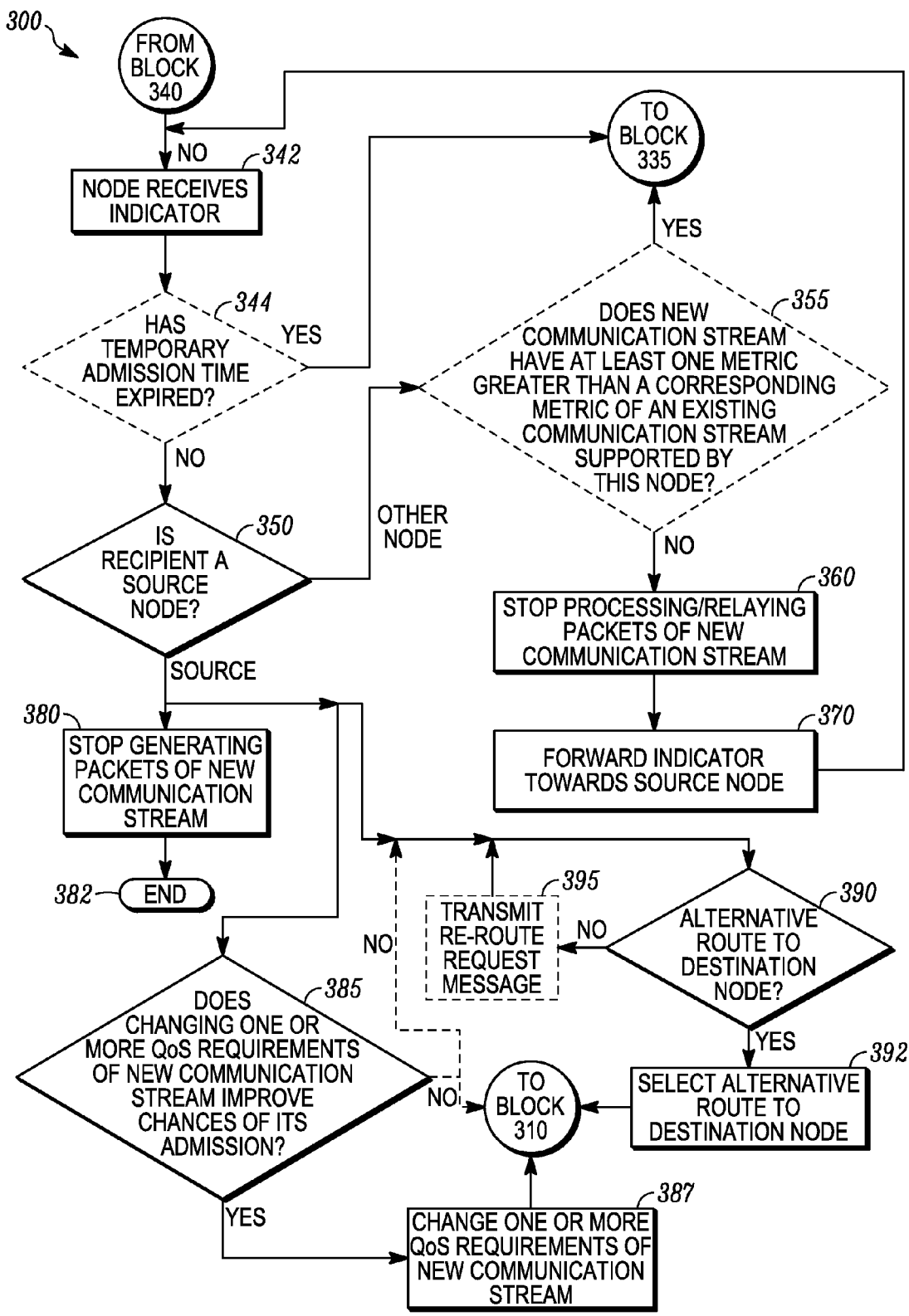

When the node is the source node 124 at step 350, the method 300 can proceed to one or more of steps 380, 385, and 390, and in this regard, each of these steps is optional. In some implementations, steps 380, 385 and 390 can be performed as alternatives to one another (as illustrated in FIG. 3B where either step 380 or step 385 or step 390 is performed). In other implementations, two or more of steps 380, 385 and 390 can be performed in series and/or combination with each other (e.g., step 380, then step 390; step 380, then step 385; step 380, step 385, then step 390; step 380, step 390, then step 385; step 385, then step 390 or vice-versa, etc.).

When the method 300 proceeds to step 380, where the source node 124 stops generating and/or transmitting packets of the new communication stream (NEW). For example, the source node 124 monitors the channel for an indicator to detect QoS infringement by the new communication stream (NEW), and if the source node 124 receives an indicator (during the temporary admission period) at step 342 and notices QoS infringement, the source node 124 stops generating and transmitting data packets at step 380. At step 382, the method 300 ends.

When the method 300 proceeds to step 385, the source node 124 determines whether changing or altering one or more of the QoS requirements of the new communication stream (NEW) would improve its chances or probability for admission. As mentioned above, the indicator can include information which indicates whether the new communication stream (NEW) would have a better chance of admission if the overall QoS requirements of the new communication stream (NEW) are reduced to a lower QoS level. When the source node 124 determines that changing or altering one or more of the QoS requirements of the new communication stream (NEW) would improve its chances or probability for admission based on information provided in one or more indicators, then the method 300 proceeds to step 387 where the source node 124 changes one or more of the QoS requirements associated with the new communication stream (NEW), and the method 300 loops back to step 310. When the source node 124 determines that changing or altering one or more of the QoS requirements of the new communication stream (NEW) would not improve its chances or probability for admission based on information provided in one or more indicators, then the method 300 proceeds, for example, to step 310 or 390.

When the method 300 proceeds to step 390, the source node 124 determines whether an alternative route to the destination node 138 exists.

If so, the method proceeds to step 392, where the source node 124 selects an alternative route, and then the method 300 loops back to step 310 and method 300 repeats. In one implementation, the source node 124 selects a new route that does not include the relay node that has received an indicator from a peripheral node and does not contain peripheral nodes that have generated an indicator. If such nodes were considered in the alternative route, it is likely that the new communication stream would again infringe the QoS of existing flows. The exclusion of such nodes will increase the likelihood that the alternative be admitted. In some implementations where the indicator includes a node ID of the node which initially generated the indicator and a metric (C) as described above at step 340, to avoid the selection of another route that would be potentially denied access, the source node 124 uses the metric (C) (or the collection of metric (C) information) to aid the route selection algorithm in the selection of the alternative route.

If no alternative route to the destination node exists, at optional step 395, the source node 124 can send a specific re-route request message or other control message to other nodes within communication range or to nodes of existing communication streams. The re-route request message request that one or more of those nodes change one or more routes of their existing communication streams to change the topology such that new communication stream can be admitted without otherwise impacting or degrading QoS requirements of the existing communication streams. If the re-route request is accepted by at least one node, the source node 124 may select an alternative route to node 138 or even retry the previously denied route.

As noted above, there are multiple different techniques for implementing step 330 described above.

Figure 4:
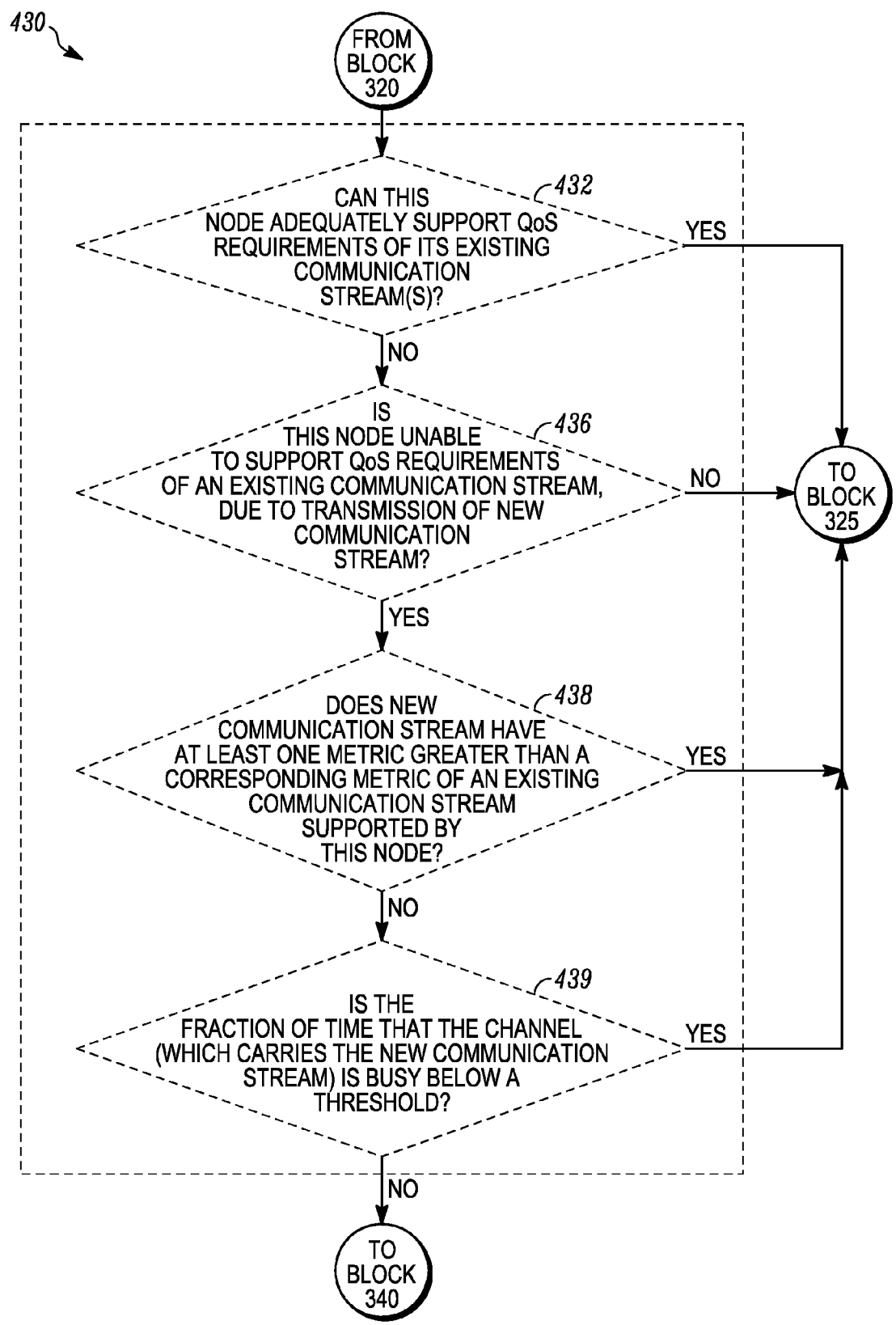
FIG. 4 is a flowchart showing one example of a method for determining whether a new communication stream (NEW) is to be admitted or denied in accordance with some implementations of the invention.

FIG. 4 is a flowchart showing one example of a method 430 for determining whether a new communication stream (NEW) is to be admitted or denied in accordance with some implementations of the invention. One or more of the steps illustrated in FIG. 4 (or any combination thereof) can be used in specific implementations of step 330 of FIG. 3. Moreover, other additional steps (not shown) can also be used in specific implementations of step 330 of FIG. 3. One implementation of step 330 includes steps 432, 436, 438 and 439. These steps are illustrated in dashed line decision boxes to indicate that these steps are optional and represent one possible series of steps for making the determination at step 330. Decision points 432, 436, 438 and 439 are optional and need not be performed. In one implementation, the method 300 includes all of steps 432, 436, 438, 439, and in such cases, the method 300 proceeds from step 320 to step 432. In other implementations, any one of the steps 436, 438, 439 or 440, or any combination of at least some of those steps, can be performed. Thus, in the implementation illustrated in FIG. 4, there are a number of ways the new communication stream can be admitted at step 335. One particular implementation will now be described below where all of steps 432, 436, 438, and 439 are performed to decide whether the new communication stream (NEW) is to be admitted; however, one or more of these steps 432, 436, 438, and 439 can be performed depending on the particular implementation.

In implementations where step 432 is implemented, at step 432 the node determines, during the temporary admission period, whether the node can adequately support each existing communication stream supported by that particular node according to existing QoS requirements associated with each of the existing communication streams which that node supports. A node is unable to adequately support an existing communication stream if the particular node is no longer able to communicate that existing communication stream while still meeting QoS requirements of that communication stream. Additionally, the node can follow the determination made by the source or destination nodes, which would determine whether QoS requirements are being met and would provide indication on specific bits on the MAC header attached to each of the packets of the new communication stream.

If not, then the method proceeds to step 436 of FIG. 4, where the node determines whether its inability to adequately support existing QoS requirements of existing communication streams which the node supports is caused by the new communication stream (NEW). A node determines whether it is unable to support the existing QoS requirements of existing communication streams by observing the packet error rate, packet interarrival times in the radio links and the power level in which packets are received. If the packets are being received with similar power levels as before but the packet error rate or the packet interarrival rate has increased, it is likely due to the traffic generated by the new communication stream. Otherwise, if the power level in which packets are received has reduced significantly, the QoS degradation is likely to be due to the fact that the transmitter and receiver of a radio link are moving farther apart from each other, making the radio link unusable.

If the node determines that the QoS degradation is not due to the new communication stream, then the method proceeds to step 335 of FIG. 3 where the new communication stream (NEW) is admitted. For example, any nodes which determine that the new communication stream (NEW) does not cause degradation of an existing communication stream 1-4 supported by that node can admit the new communication stream (NEW). Admission of the new communication stream (NEW) can refer to a new or continued transmission of the new communication stream (NEW). This can refer to: a continuation of the current, new communication stream; a new version of the current, new communication stream (i.e., starting at the beginning); or another communication stream different than the current, new communication stream. However, in all versions of the communication stream, the transmission characteristics (number of packets transmitted per second and duration of packet transmission) is kept the same.

In implementations where step 436 is implemented, at step 436 the node determines whether the new communication stream (NEW) has caused the node's inability to adequately support existing QoS requirements of it's existing communication streams. If not, then the method proceeds to step 335 of FIG. 3 where the new communication stream (NEW) is admitted. If so, then the method proceeds to step 438 of FIG. 4 where the node determines whether the new communication stream (NEW) has at least one metric which is greater than a corresponding metric of at least one of it's existing communication streams. Examples of these metrics are described above.

In implementations where step 438 is implemented, at step 438, the node determines whether the new communication stream has at least one metric greater than or equal to a corresponding metric of one or more of the existing communication streams which the node supports. This allows the node to determine whether or not the new communication stream is "better than" or has higher priority than one or more of the existing communication streams that the node supports. In one implementation, the metric can be any one of the following parameters or can be computed based on any combination of the following parameters: type of new communication stream (e.g., real-time stream, non-real-time stream, best effort stream, etc); organizational rank of user of source node 124; and organizational rank of user of destination node 138.

If so, then the method proceeds to step 335 of FIG. 3 where the new communication stream (NEW) is admitted. If not, then the method proceeds to step 439 of FIG. 4 where the node determines whether the fraction of time that the channel, which carries the new communication stream (NEW), is busy is above or below a threshold.

In implementations where step 439 is implemented, then at step 439, when the node determines that the fraction of time during which the channel, which carries the new communication stream (NEW), is busy is above the threshold, then the method 300 proceeds to step 335 where the new communication stream (NEW) is admitted as described above, as described above, so that transmission of the new communication stream (NEW) or another communication stream by the source node is permitted.

By contrast, when the node determines at step 439 that the fraction of time that the channel is busy is at or below a threshold, then the method proceeds to step 340 as described above.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for distributed admission control and quality of service (QoS) in a wireless multi-hop network, the wireless multi-hop network comprising a plurality of nodes including a source node, a destination node, and a plurality of intermediate nodes, the method comprising:
   at at least one of the plurality of intermediate nodes along a route between the source node and the destination node:
   receiving a new communication stream including a QoS requirement of the new communication stream from the source node destined for the destination node,
   temporarily admitting the new communication stream during a temporary admission period,
   determining, during the temporary admission period, whether the at least one of the plurality of intermediate nodes can support the QoS requirement of the new communication stream;
   transmitting, when the at least one of the plurality of intermediate nodes determines that it is unable to support the QoS requirement of the new communication stream, an indicator which indicates one or more suggested QoS requirements that the at least one of the plurality of intermediate nodes could provide to the source node;
   receiving, at one or more of the plurality of nodes, the indicator including the one or more suggested QoS requirements; and
   forwarding the indicator from at least one of the one or more of the plurality of nodes towards the source node;
   stopping, at the source node upon receiving the indicator, generation of packets of the new communication stream; and
   determining, at the source node upon receiving the indicator, whether using the suggested one or more of the QoS requirements of the new communication stream will increase chances of admission of the new communication stream along the route.

2. The method as claimed in claim 1, further comprising at the the at least one of the plurality of intermediate nodes:
   permitting transmission after the temporary admission period of the new communication stream by the source node when the at least one of the plurality of intermediate nodes determines that it can support the QoS requirement of the new communication stream.

3. The method as claimed in claim 1, wherein the operation of determining, at the at least one of the plurality of intermediate nodes during the temporary admission period, whether the at least one of the plurality of intermediate nodes can support the QoS requirement of the new communication stream comprises:

determining, at the at least one of the plurality of intermediate nodes during the temporary admission period, whether that at least one of the plurality of intermediate nodes is able to support each of its currently supported communication streams according to QoS requirements associated with each of the currently supported communication streams; and when the at least one of the plurality of intermediate nodes is unable to support one or more of its currently supported communication streams according to the QoS requirements associated with the currently supported communication streams, determining whether a degradation of at least one of the currently supported communication streams by that at least one of the plurality of intermediate nodes is caused by the new communication stream.

4. The method as claimed in claim 3, further comprising at the the at least one of the plurality of intermediate nodes:

determining, upon receiving the new communication stream, whether the new communication stream has at least one metric higher than a metric of any of the currently supported communication streams of the at least one of the plurality of intermediate nodes; and admitting the new communication stream at the at least one of the plurality of intermediate nodes when the at least one of the plurality of intermediate nodes determines that the new communication stream has at least one metric higher than a metric of any of the currently supported communication streams of the at least one of the plurality of intermediate nodes such that continued transmission of the new communication stream from the source node is permitted by the at least one of the plurality of intermediate nodes.

5. The method as claimed in claim 1, further comprising at the at least one of the plurality of intermediate nodes:

determining whether a fraction of time that a channel is busy is below a threshold; and suppressing transmission of the indicator when the fraction of time that the channel is busy is below the threshold.

6. The method as claimed in claim 1, further comprising at the at least one of the plurality of intermediate nodes:

determining whether packet transmission rates of neighbor nodes have not increased by more than a particular percentage; and suppressing transmission of the indicator when the packet transmission rates of the neighbor nodes have not increased by more than the particular percentage.

7. The method as claimed in claim 1, further comprising in response to receiving the indicator at the source node, operating the source node to:

determining whether one or more alternative routes to the destination node exist;

selecting one of the one or more alternative routes to the destination node using a selection criteria, wherein the selection criteria are designed to decrease a probability of selection of routes which: include one or more relay nodes that have received an indicator from a peripheral node, or include peripheral nodes that have generated an indicator; and transmitting a re-route request message to other nodes if no alternative routes to the destination node exist, wherein the re-route request message requests that one or more nodes change one or more routes of their currently supported communication streams to change topology such that new communication stream can be admitted without degrading QoS requirements of their currently supported communication streams.

8. The method as claimed in claim 1, further comprising:

receiving, at one or more of the plurality of nodes, the indicator; and stopping, at the one of the one or more of the plurality of nodes which receives the indicator, processing of packets of the new communication stream.

9. The method as claimed in claim 1, wherein the plurality of nodes further include: one or more relay nodes along the route between the source node and the destination node, and wherein the new communication stream is communicated towards the destination node by the one or more relay nodes, and further comprising:

receiving, at the one or more relay nodes, the indicator; and stopping, at the one or more relay nodes which receive the indicator, relaying of packets of the new communication stream.

10. The method as claimed in claim 1, wherein the new communication stream comprises: one or more dummy packets which are transmitted using a same packet size and a same packet inter-arrival time as regular packets of the new communication stream during the temporary admission period.

11. The method as claimed in claim 1, wherein transmitting an indicator further, comprises:

transmitting a unicast QoS Infringement Alert (QIA) message to a neighbor node which has a highest increase of packet transmission rate during a measurement period.

12. The method as claimed in claim 1, further comprising:

communicating two new communication streams to the at least one of the plurality of intermediate nodes;

assigning a priority to each of the two new communication streams based on at least one metric associated with each of the two new communication streams;

receiving, at the at least one of the plurality of intermediate nodes, the indicator; and stopping, at the node upon receiving the indicator, processing of packet associated with the new communication stream having a lower priority.

13. A wireless multi-hop network for providing admission control and quality of service (QoS), the wireless multi-hop network comprising:

a destination node;

a source node; and at least one intermediate node along a route between the source node and the destination node, the at least one intermediate node operating to: receive a new communication stream including a QoS requirement of the new communication stream from the source node and destined for the destination node, temporarily admit the new communication stream during a temporary admission period, determine whether the at least one intermediate node can support the QoS requirement of the new communication stream, and transmit, when the at least one intermediate node is unable to support the QoS requirements of the new communication stream, an indicator which indicates that one or more suggested QoS levels that the at least one intermediate node could provide, wherein each node further operates to:

receive the indicator including the one or more suggested QoS levels; and forward the indicator towards the source node that generated the new communication stream so that the source node stops generating packets of the new communication stream;

wherein the source node further operates to, upon receiving the indicator, stop generating packets of the new communication stream, and determine whether the suggested one or more of the QoS levels of the new communication stream will allow admission of the new communication stream along the route.

14. The wireless multi-hop network as claimed in claim 13, wherein:
one or more intermediate nodes of the at least one intermediate node, which determine that the QoS requirement of the new communication stream can be supported further operate to permit continued transmission of the new communication stream by the source node after the temporary admission period.

15. The wireless multi-hop network as claimed in claim 13, wherein the the at least one intermediate node further operates to determine, during the temporary admission period, whether that at least one intermediate node is able to support the QoS requirement of the new communication stream along with each of its currently supported communication streams according to QoS requirements associated with each of the currently supported communication streams, and
wherein the at least one intermediate node, which determines that the at least one intermediate node is unable to support one or more of the each of the currently supported communication streams according to the QoS requirements associated with each of the currently supported communication streams of the at least one intermediate node, operates to determine whether a degradation of at least one of the each of the currently supported communication streams by that at least one intermediate node is caused by the new communication stream.

16. The wireless multi-hop network as claimed in claim 15, wherein the at least one intermediate node further operates to:
determine, upon receiving the new communication stream, whether the new communication stream has at least one metric higher than a metric of any of the currently supported communication streams of the at least one intermediate node; and
admit the new communication stream at the at least one intermediate node when the at least one intermediate node determines that the new communication stream has at least one metric higher than a metric of any of the currently supported communication streams of the at least one intermediate node such that continued transmission of the new communication stream from the source node is permitted by the at least one intermediate node.

17. The wireless multi-hop network as claimed in claim 16, wherein the at least one intermediate node further operates to determine whether at least one of:
a fraction of time that a channel is busy is below a threshold, and
packet transmission rates of neighbor nodes have not increased by more than a particular percentage; and
wherein the at least one intermediate node operates to suppress transmission of the indicator if at least one of: the fraction of time that the channel is busy is below the threshold; and the packet transmission rates of the neighbor nodes have not increased by more than the particular percentage.

18. The wireless multi-hop network as claimed in claim 13, wherein each node further operates to:
stop processing of packets of the new communication stream upon receiving the indicator.

19. The wireless multi-hop network as claimed in claim 13, wherein the wireless multi-hop network further includes:
one or more relay nodes along the route between the source node and the destination node, and wherein the new communication stream is communicated towards the destination node by the one or more relay nodes, and wherein the one or more relay nodes which receive the indicator are further designed to stop relaying of packets of the new communication stream.

20. A node operable to communicate along a route between a source node and a destination node in a wireless multi-hop network, the node comprising:
a receiver designed to receive a new communication stream including a quality of service requirement of the new communication stream from the source node and destined for the destination node;
a processor designed to determine whether the node can support a Quality of Service (QoS) requirement of the new communication stream, and
a transmitter designed to transmit an indicator which indicates that one or more suggested QoS levels that the node could provide to the source node that generated the new communication stream when the node determines it cannot support the QoS requirement of the new communication stream so that the source node stops generating packets of the new communication stream upon receiving the indicator, stops generating packets of the new communication stream, and determines whether the suggested one or more of the QoS levels of the new communication stream will allow admission of the new communication stream along the route.

21. The method as claimed in claim 1, wherein the one or more suggested QoS requirements for the new communication stream comprise QoS requirements that provide a better chance of being admitted.

22. The method as claimed in claim 1, further comprising:
transmitting, by a peripheral node an indication that the peripheral node cannot support QoS requirements of its currently supported communication streams,
wherein the peripheral node is not part of the route between the source node and the destination node.

* * * * *